(12) United States Patent
Medinkov et al.

(10) Patent No.: US 7,275,015 B2
(45) Date of Patent: Sep. 25, 2007

(54) METHOD AND DEVICE FOR DETERMINING MOTION PARAMETERS OF A CONDUCTIVE, PROFILED SURFACE

(75) Inventors: Stanislav Medinkov, Ortenburg (DE); Mark Netchaewskij, Samara (RU); Felix Mednikov, Ortenburg (DE); Werner Grömmer, Ortenburg (DE); Martin Sellen, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 1 day.

(21) Appl. No.: 11/257,677

(22) Filed: Oct. 25, 2005

(65) Prior Publication Data
US 2006/0071658 A1    Apr. 6, 2006

Related U.S. Application Data

(63) Continuation of application No. PCT/DE2004/00296, filed on Feb. 17, 2004.

(30) Foreign Application Priority Data
Apr. 30, 2003 (DE) .................... 103 19 818
Jul. 17, 2003 (DE) .................... 103 32 761

(51) Int. Cl.
*G01B 7/00* (2006.01)

(52) U.S. Cl. .................... 702/155; 702/33; 702/38; 324/207.13

(58) Field of Classification Search ............ 702/155, 702/33–38, 57, 64, 65, 189, 198; 324/207.17, 324/225, 160; 73/1.37
See application file for complete search history.

(56) References Cited

U.S. PATENT DOCUMENTS

| 4,611,169 A * | 9/1986 | Hermann ............ 324/207.17 |
| 6,288,536 B1 * | 9/2001 | Mandl et al. ............ 324/225 |
| 2003/0141862 A1 * | 7/2003 | Vig et al. ............ 324/174 |

FOREIGN PATENT DOCUMENTS

| DE | 32 01 811 A1 | 9/1983 |
| DE | 32 44 420 A1 | 6/1984 |
| DE | 34 09 448 C2 | 9/1984 |
| DE | 196 31 438 A1 | 2/1998 |
| DE | 196 46 056 A1 | 5/1998 |
| DE | 199 27 759 A1 | 1/2001 |

\* cited by examiner

*Primary Examiner*—Eliseo Ramos-Feliciano
*Assistant Examiner*—Phuong Huynh
(74) *Attorney, Agent, or Firm*—Alston & Bird LLP (57) ABSTRACT

A method and a device for determining motion parameters of a conductive, profiled surface (22) relative to a sensor (3), with the sensor (3) comprising at least one coil for generating an electromagnetic alternating field, which is subjected, because of the feedback resulting from position changes between the surface (22) and the sensor (3), to a variation, which is determined by means of the coil (16). The position change is derived from the coupling impedance ($Z_c$) of the coil (16), and the real component ($R_c$) and the imaginary component ($X_c$) of the complex coupling impedance ($Z_c$) of the coil (16) are determined, with a distance d between the sensor (3) and the surface (22) being computed based on the determined values while using an algorithm as a basis.

28 Claims, 6 Drawing Sheets

METHOD AND DEVICE FOR DETERMINING MOTION PARAMETERS OF A CONDUCTIVE, PROFILED SURFACE

CROSS REFERENCE TO RELATED APPLICATION

The present application is a continuation of international application PCT/DE2004/000296, filed 17 Feb. 2004, and which designates the U.S. The disclosure of the referenced application is incorporated herein by reference.

BACKGROUND OF THE INVENTION

The present invention relates to a method and a device for determining motion parameters of a conductive, preferably profiled surface relative to a sensor, with the sensor comprising at least one coil of a coil system for generating an electromagnetic alternating field, and which is subjected, because of the feedback resulting from position changes between the surface and the sensor, to a variation that is determined by means of the coil system.

Methods and devices of the type under discussion are already known from practical operation, and they are of special importance, in particular when a first object moves relative to a second object at a defined distance, as is the case, for example, with magnetic bearings, levitation devices, gear misalignment detection devices, etc.

DE 32 44 420 C2 discloses a distance sensor for a magnetic levitation vehicle. This sensor comprises one transmitting coil and two receiving coils, with the transmitting coil being designed as an elongate flat winding, which extends with its coil axis obliquely to the direction of movement of the magnetic levitation vehicle. This special arrangement reduces in part the so-called slot-tooth ripple. However, this sensor permits measuring only distances in a range from 10 to 15 mm.

DE 199 27 759 A1 discloses a device for magnetically measuring the distance between a toothed, ferromagnetic pole wheel and a magnetically sensitive sensor that is positioned in the direct vicinity of the pole wheel, and which is used to detect the movement of the toothed wheel. The gist of the invention is the use of a permanent magnet, whose pole surface facing the toothed object is adequately large in proportion with the pole wheel module, so that the position of the neutral zone in the permanent magnet remains nearly unaffected by the respective position of the pole wheel teeth. This device could also be used to determine the rotational speed, the speed, and the path of the pole wheel. Disadvantageous, however, in this device is its low accuracy, in particular in the case of relatively great distances between the sensor and the pole wheel.

In a device disclosed in DE 34 09 448 C2, use is made of the magnetic gap-dependent damping of the magnetic alternating field by the eddy current effects in the reaction rail. In this connection, the inductive reactance of the coil system is fully compensated with the aid of a capacitor that is operated in parallel or series connection, and with that, the distance signal is essentially determined from the active resistance of the coil system. A disadvantageous effect in this case is that the measuring accuracy of the entire device is very strongly influenced by the tolerances of the parameters of the coil system and the compensating capacitors, which are unavoidable in the real buildup.

It is therefore an object of the present invention to provide a method and a device of the initially described type for determining motion parameters of a conductive, preferably profiled surface relative to a sensor, wherein it is possible to measure on the one hand a greatest possible distance between a profiled surface and the sensor, and wherein on the other hand the slot-groove ripple, i.e., signal changes, which develop upon moving over the teeth and slots, as well as influences caused by temperature fluctuations are eliminated as much as possible. Moreover, it is an object to enable at the same time a measurement and evaluation of the relative speed between the surface and the sensor.

SUMMARY OF THE INVENTION

In accordance with the invention, the foregoing object as to a method for determining motion parameters of a conductive, preferably profiled surface relative to a sensor is accomplished by a method wherein the position change is derived from the coupling impedance ($Z_c$) of the coil system, and wherein the real component ($R_c$) and the imaginary component ($X_c$) of the complex coupling impedance ($Z_c$) of the coil are determined, with the distance d between the sensor and the surface being computed based on the determined values while using an algorithm as a basis.

Furthermore, the foregoing object with respect to a device for determining motion parameters of a conductive, preferably profiled surface relative to a sensor is accomplished by a device of the initially described type and which is configured such that the coupling impedance ($Z_c$) of the coil can be measured, with a special arrangement of measuring means being provided to determine the real component $R_c$ and the imaginary component $X_c$ of the complex coupling impedance $Z_c$ of the coil system, and to compute the distance and the relative speed or rotational speed between the surface and the sensor based on the aforesaid measurements.

In the place of an individual coil, the sensor could also comprise a coil system with at least two coils. In this case, the second coil could advantageously be used for compensating drifts or other influences.

Based on the measured values, the distance d between the profiled surface and the sensor could be determined by means of function (1):

$$d = f\left(R_c, X_c, \frac{X_c}{R_c}\right) \quad (1)$$

With the aid of the cycle duration of the function from equation (2) it is then possible to conclude, via equation (3), the relative speed v or the rotational speed between the profiled surface and the sensor:

$$F_x = f\left(\frac{X_c}{R_c}\right) \quad (2)$$

$$v = \frac{L}{T(F_x)} \quad (3)$$

where L is the sum of the length of a tooth and a slot (note FIG. 3a), and $T(F_x)$ is the cycle duration of the function $F_x$.

In a preferred configuration, it would be possible to use the same coil for generating the electromagnetic alternating field and as receiving coil. This reduces the time and material required for the measuring method and makes the measuring device simple and easy to operate, while simultaneously precluding possible sources of error.

The computation of the real component ($R_c$) and the imaginary component ($X_c$) of complex coupling impedance ($Z_c$) could occur with the use of a mathematical model, which describes on the one hand the coil for generating an alternating field and on the other hand the influence of the conductive, profiled surface on the coupling impedance $Z_c$ of the coil resulting from the position changes between the sensor and the surface.

The real and imaginary components of the coupling impedance $Z_c$ can be determined according to the theory from the following equations:

$$R_c = k_0 \omega \eta e^{-\frac{3}{2}\alpha d} \frac{f_1(k_1, \omega, \sigma, \mu)}{f_3(k_3, \omega, \sigma, \mu)} \quad (4)$$

$$X_c = k_0 \omega \eta e^{-\frac{3}{2}\alpha d} \frac{f_2(k_2, \omega, \sigma, \mu)}{f_3(k_3, \omega, \sigma, \mu)} \quad (5)$$

where d is the distance between the sensor and the surface, $\omega$ the energizing frequency, and a and g respectively the electric conductivity and magnetic permeability of the material of the surface.

From equations (4) and (5) it becomes obvious that $R_c$ and $X_c$ essentially change exponentially with the distance d.

From these equations, one could likewise compute the phase angle $\Phi_c$ of the complex coupling impedance $Z_c$ by the equation $$\tan \varphi_C = \frac{f_2(k_2, \omega, \sigma, \mu)}{f_1(k_1, \omega, \sigma, \mu)} \quad (6)$$

In a first approximation, the phase angle $\Phi_c$ is independent of the distance d.

The setup of these equations and their different parts are not to be discussed in greater detail. However, it should be remarked that the determination of $R_c$, $X_c$, and $\tan \Phi_c$ can be used to compute the distance d and the relative speed (or rotational speed) between the profiled surface and the coil system. Within the scope of the computation, it would be possible to take into account the electromagnetic properties $\mu$ and $\sigma$ of the surface.

An advantageous variant provides for determining the distance d between the conductive, preferably profiled surface and the sensor that generates an alternating field, on the basis of the equations (4) and (5) via the equation $$d = k_1 \cdot \frac{X_c}{R_c} - \ln(X_c) \quad (7)$$

In this case, it is especially advantageous that the distance d between the sensor and the profiled surface as computed via equation (7), has essentially no slot-tooth ripple.

At the same time, it would be possible to determine the relative speed v or the rotational speed of a surface having evenly spaced teeth and slots relative to the sensor via equations (2) and (3).

As aforesaid, the sensor system could comprise a measuring coil which is used to generate an alternating field and as a receiving coil. Possible, however, would also be the use of two coils, with the one coil being used for generating the alternating field, and the other coil serving as a measuring coil. In both cases, the measuring coil could be described by the mathematical model according to equations (4) and (5). The measuring coil could then be constituted such that the mathematical model can be used in the computation of the coil parameters. The use of this mathematical model has made it possible to reduce the so-called slot-tooth ripple, i.e., the impedance variations of the measuring coil that develop when moving over the teeth and slots.

To further reduce the slot-tooth ripple, a variant has turned out to be advantageous, wherein the magnetic field of the measuring coil monotonically increases in the direction of movement, independently of the distance, as far as the center of the measuring coil, and monotonically decreases again in the same way. Such a pattern of the magnetic field could be realized, for example, in that portions of the winding of the measuring coil, which are perpendicular to the direction of movement, are made such that the inductive components of these portions can be very greatly reduced and thus barely affect the measuring result.

Furthermore, it is of advantage to compensate the influence of the temperature on the coupling impedance or $R_c$ and $X_c$ of the measuring coil. To this end, the coil system could include in addition to the measuring coil, a compensation coil (reference coil), whose impedance is independent of the distance d. In this case it is important that the quality of the reference coil equals the quality of the measuring coil at a maximal distance d between the sensor and the surface, when the surface exerts no influence on the measuring coil. These requirements could be met by means of the coil parameters, such as, for example, number of windings, wire diameters, etc. A weighted subtraction of the real and imaginary components of the two coils would then make it possible to compensate the temperature influence. In a concrete configuration, the measuring coil and the compensation coil could be energized with ac currents of a same fixed frequency.

In terms of signals, the preparation of the real component ($R_c$) and the imaginary component ($X_c$) of the complex coupling impedance ($Z_c$) of the measuring coil could be realized in two variants. In a first variant, it would be possible to determine real and imaginary components of the complex coupling impedance $Z_c$, for example, in the following three steps:

1. The real component $Re[Z_o]$ and the imaginary component $Im[Z_o]$ of the impedance $Z_o$ of the measuring coil are determined without surface.

2. The real component $Re[Z_m]$ and the imaginary component $Im[Z_m]$ of the impedance $Z_m$ of the measuring coil are determined under the influence of the surface.

3. From the values of steps 1 and 2, it is then possible to determine by subtraction, the real component and the imaginary component of the complex coupling impedance $Z_c$ via the equations $R_c = R_m - R_o$ $X_c = X_m - X_o$.

In a second variant, the determination of real and imaginary components of the complex coupling impedance Zc could occur in the following two steps:

1. One determines the complex coupling impedance $Z_c = Z_m - Z_o$ directly by a weighted subtraction from the impedances of the measuring and reference coils.

2. From the complex coupling impedance $Z_c$, one determines the real component $R_c$ and the imaginary component $X_c$.

There exist various possibilities of improving and further developing the teaching of the present invention in an advantageous manner. To this end, one may refer on the one hand to the claims, and on the other hand to the following detailed description of preferred embodiments of the invention with reference to the drawings. In conjunction with the detailed description of the preferred embodiments of the invention with reference to the drawings, also generally preferred improvements and further developments of the teaching are described in greater detail.

BRIEF DESCRIPTION OF THE DRAWINGS

In the drawings:

FIG. 2b is a more accurate schematic view of the sensor of FIG. 2a;

FIG. 3b is a more accurate schematic view of the sensor of FIG. 3a;

DETAILED DESCRIPTION OF THE PREFERRED EMBODIMENTS

Figure 1:
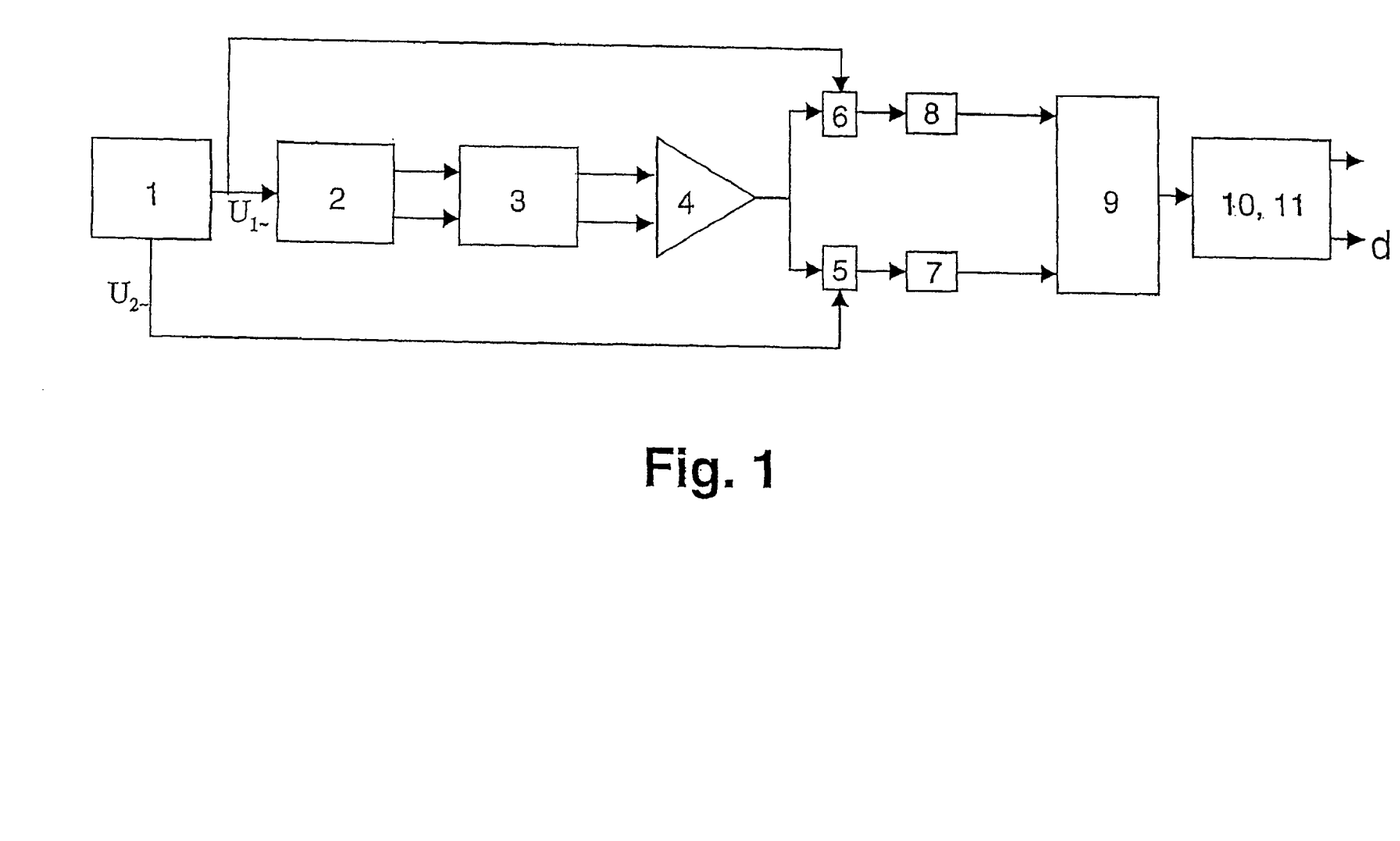
FIG. 1 is a schematic view of a block diagram of a device according to the invention for determining motion parameters of a conductive, preferably profiled surface relative to a sensor.

FIG. 1 schematically illustrates a block diagram of a device according to the invention for determining motion parameters of a conductive, preferably profiled surface relative to a sensor. According to the circuit shown in FIG. 1, an oscillator 1 generates a sinusoidal voltage $U_{1-}$ of a certain fixed frequency f and at the same time a second sinusoidal voltage $U_{2-}$ of the same frequency f, which is 90° out-of-phase relative to the voltage $U_{1-}$. The voltage $U_{1-}$ connects to the input of a driver 2 which energizes a sensor 3 consisting of a measuring coil and a reference coil.

From the measuring signals of the measuring and reference coils, a difference is formed in an amplifier 4. This difference is multiplied in a multiplier 5 with the signal $U_{1-}$, and in a multiplier 6 with the signal $U_{2-}$. After low-pass filters 7 and 8, two voltages $U_{c1}$ and $U_{c2}$ result, with $U_{c1}$ being proportionate to the real component ($R_c$), and $U_{c2}$ to the imaginary component ($X_c$) of a complex coupling impedance $Z_c$ of the coil system. With the aid of an analog-to-digital converter 9, the two voltages are digitized. In a microcontroller 10, a required distance d is computed, for example, on the basis of equation (1). Furthermore, it is possible to compute the speed v with equations (2) and (3).

Finally, with the aid of an EEPROM 11, the characteristic for the distance d may additionally be linearized.

Figure 2A:
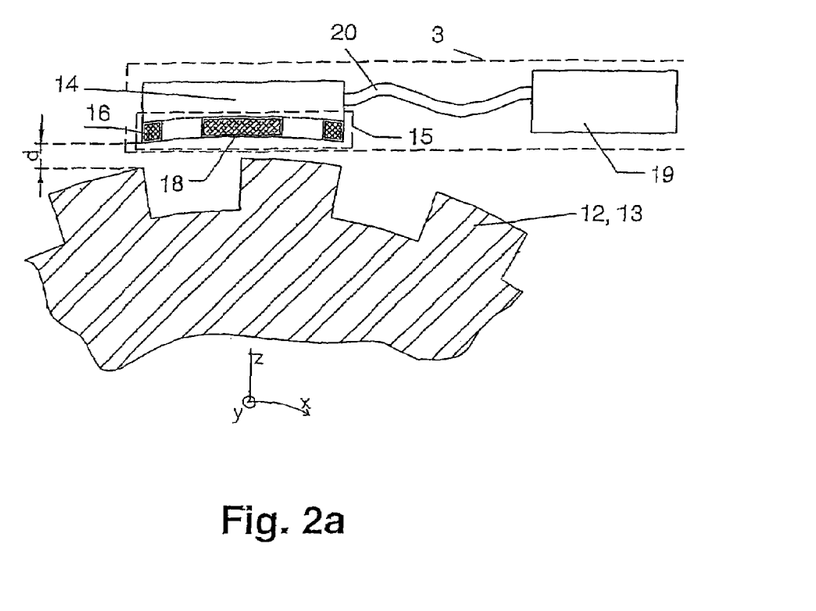
FIG. 2a is a schematic view of an inductive sensor according to a first embodiment of a device according to the invention for measuring the distance from a gear and for measuring the speed of the gear.

FIG. 2a illustrates a sensor 3 for simultaneously measuring the distance d from a test object 12 in the form of a gear 13, for example, for determining the unbalance, and for measuring the speed of the gear 13. The sensor 3 comprises a flat, ferromagnetic coil support 14 which is adapted to the curvature of the gear 13, and whose surfaces mount a coil system 15.

Figure 2B:
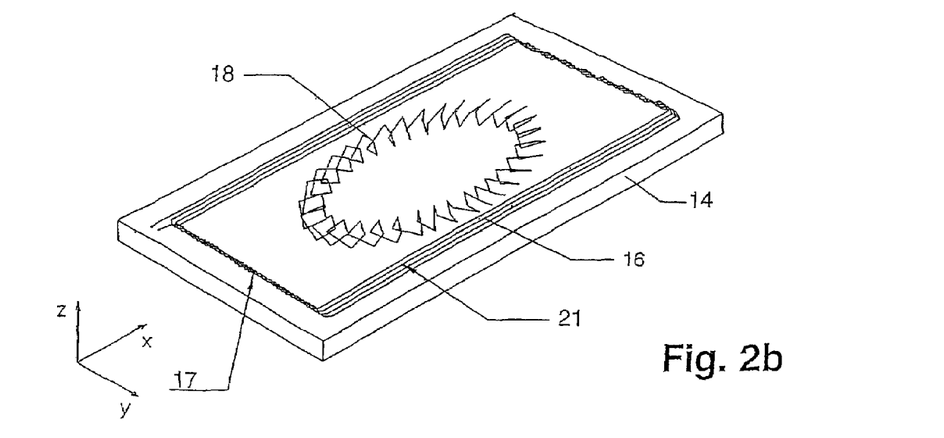

The coil system 15 is shown more accurately in FIG. 2b, and comprises a measuring coil 16, which is constructed such that in the case of each of its winding components 17, which extend perpendicularly to the direction of movement of the gear (y-direction), a plurality of wires are twisted together. The length of the measuring coil 16 in the x-direction corresponds approximately to a slot-tooth pitch of the gear 13. A compensation coil 18 is wound as an annular coil over the coil support 14, thereby making the coil parameters independent of the test object 12. An electronic unit 19 that is additionally shown in FIG. 2a connects via a cable 20 to the measuring coil 16.

Figure 3A:
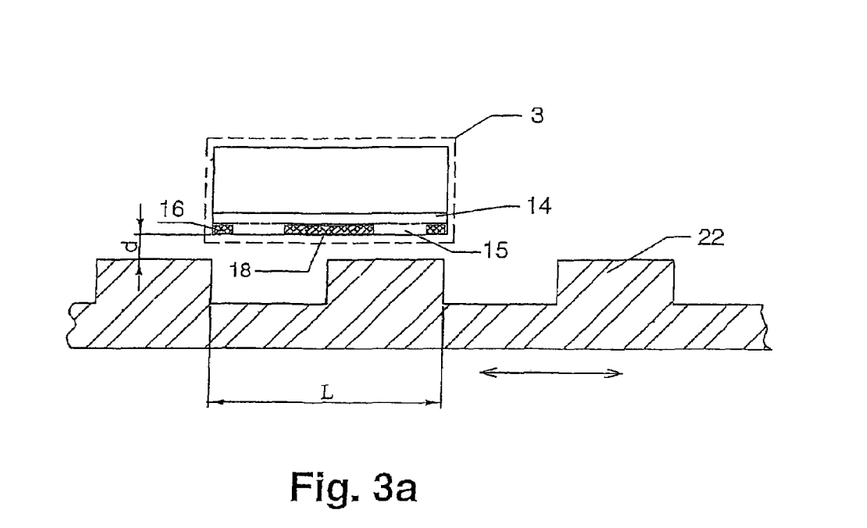
FIG. 3a is a schematic view of an inductive sensor according to a second embodiment of a device according to the invention for measuring the distance of a magnetic levitation vehicle from its profiled guideway as well as for measuring its speed.

The arrangement shown in FIG. 3a represents a sensor 3 that is designed for installation into a magnetic levitation vehicle. This arrangement is intended to determine both the distance d of the vehicle from a profiled guideway and the speed of the vehicle. Identical components have been provided with the same numerals as used in FIG. 2.

Figure 3B:
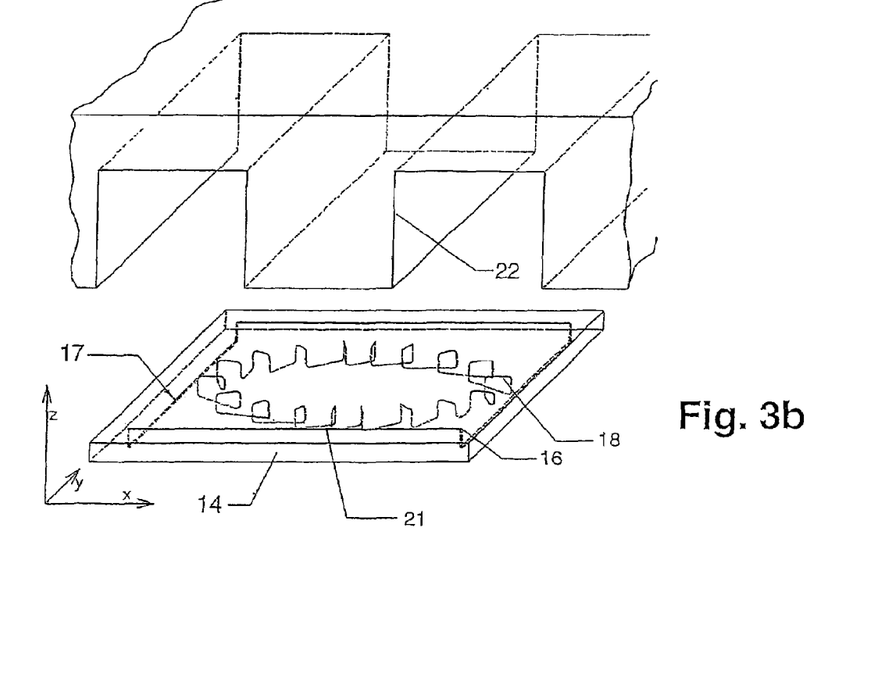

As best seen in FIG. 3b, the sensor 3 comprises a flat, ferromagnetic coil support 14, whose surface mounts a measuring coil 16 such that its winding components 21 which are oriented in the x-direction, are located on the side of the carrier 14 that faces a surface 22. The winding components 17 arranged in the y-direction are located on the side of the carrier 14 that faces away from the profiled surface 22. Likewise in this arrangement, the reference coil 18 extends as an annular coil around the support 14.

Figure 4:
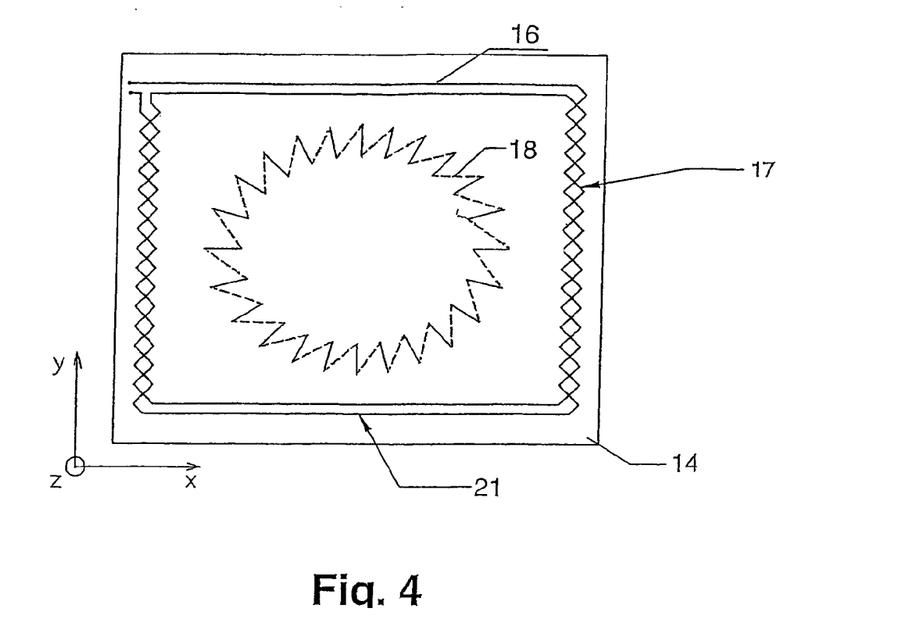
FIG. 4 is a schematic view of a sensor of FIGS. 2 and 3 with the use of planar technology.

FIG. 4 shows an arrangement of FIG. 2 or 3, with the coil being constructed with the use of planar technology.

Figure 5:
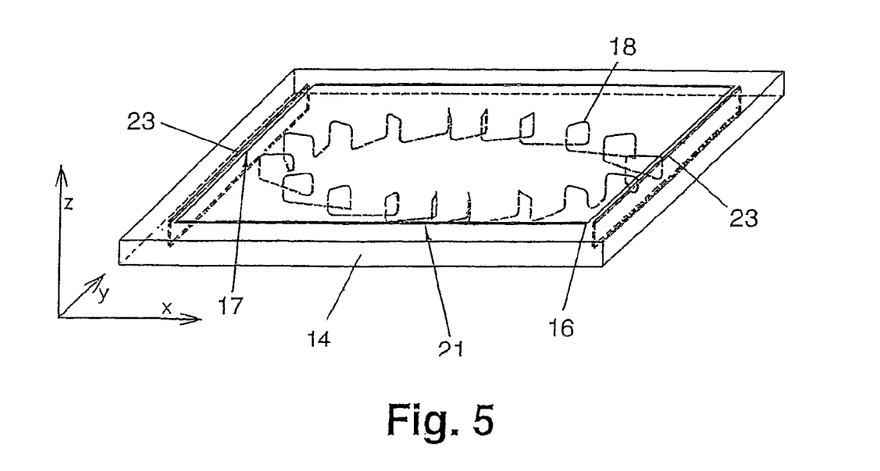
FIG. 5 is a schematic view of a sensor according to a further embodiment of a device of the invention.

FIG. 5 illustrates a further embodiment of the sensor 3, wherein the magnetic field of the winding components 17 of the measuring coil 16 that extend in the y-direction, is canceled by an opposing field. This is realized by two winding components 23, which are wound in the y-z-plane. With that, the field of the winding components 17 is eliminated, so that only the field of the winding components 21 is still of importance for the measurement. The remaining field of the winding components 23 is no longer relevant for the measurement.

Figure 6:
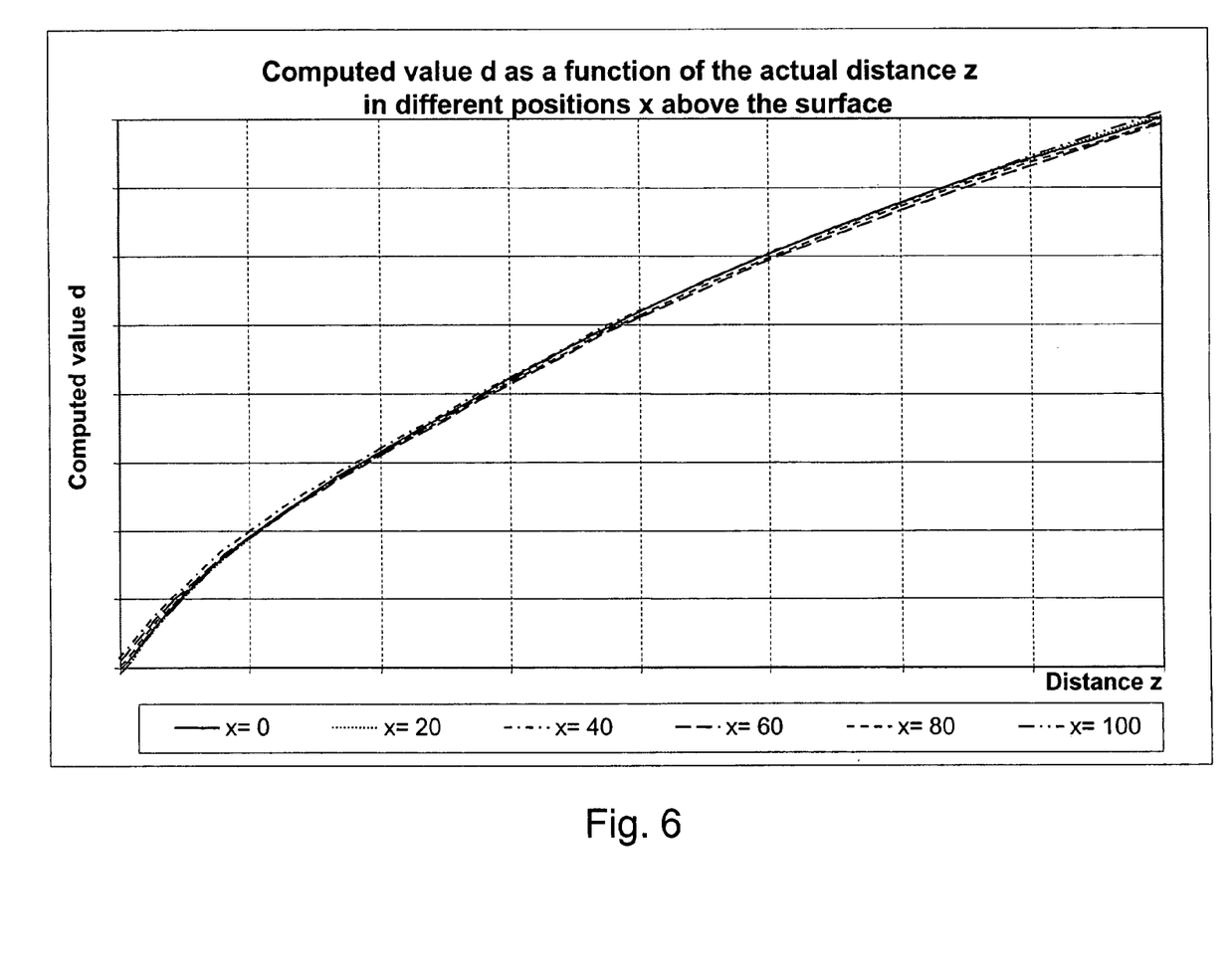
FIG. 6 is a diagram illustrating the computed distance as a function of the actually measured distance in different positions x across the surface.

In FIG. 6, the computed value for the distance d is plotted as a function of the real distance z. As parameters, different positions x of the sensor 3 above the profiled surface 22 are entered. It becomes obvious that the computed value d is approximately independent of the position x of the sensor 3 relative to the profiled surface 22. Consequently, the method of the invention is suited for an exact determination of the required distance z.

Figure 7:
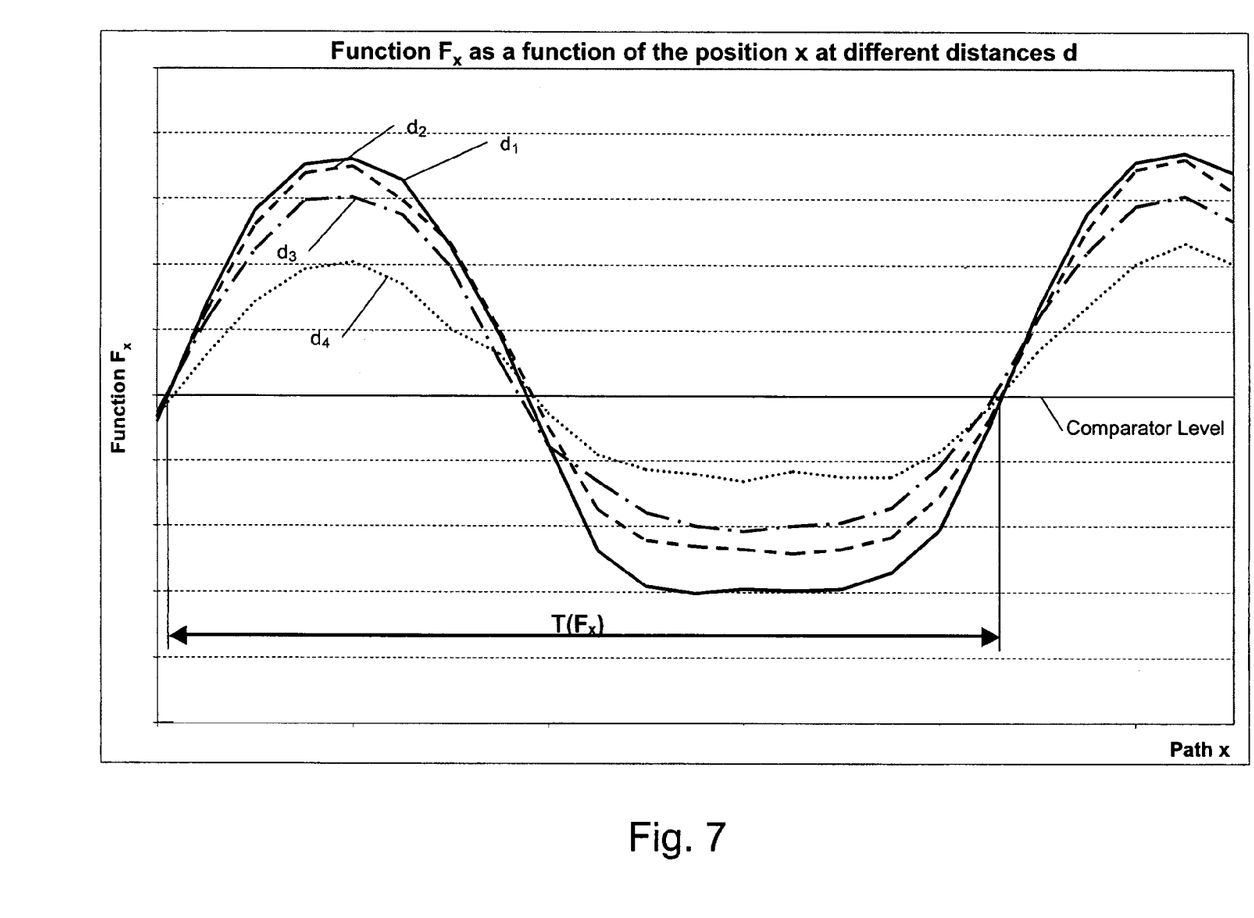
FIG. 7 is a diagram showing the function $F_x$ as a function of the position x at different distances d.

As best seen in FIG. 7, the steady component of the function $F_x$ is nearly independent of the distance d between the sensor 3 and the profiled surface 22. A suitable selection of the comparator level thus permits determining the time between two successive upward and downward slopes. This cycle duration $T(F_x)$ can then be used to determine in accordance with equation (3) the speed or rotational speed of the profiled surface 22 relative to the sensor 3.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for determining motion parameters of a conductive profiled surface relative to a sensor, with the sensor having a coil system comprising at least one coil, and comprising the steps of
generating an electromagnetic alternating field from the coil system of the sensor,
subjecting the field by reason of the feedback resulting from position changes between the surface and the sensor to a variation which can be sensed by the coil system, and
deriving the position changes from the complex coupling impedance $Z_c$ of the coil system, and including determining the real component $R_c$ and the imaginary component $X_c$ of the complex coupling impedance $Z_c$ of the coil system, and computing a distance d between the sensor and the surface based on the determined values of the real component and the imaginary component and using an algorithm,
communicating the computed distance d to a user, and wherein the mathematical function $$d = f\left(R_c, X_c, \frac{X_c}{R_c}\right)$$

serves as the al 2orithm, with the relative speed or rotational speed between the surface and the sensor being determined from the function $$v = \frac{L}{T(F_x)}$$

and with L being the sum of the lengths of a tooth and a slot of the profiled surface, and $T(F_x)$ the cycle period of the function $$F_x = f\left(\frac{X_c}{R_c}\right).$$

2. The method of claim 1, wherein the coil system of the sensor comprises at least two coils, with one of the coils being used to compensate for drifts or other influences.

3. The method of claim 2, wherein the computation of the real component ($R_c$) and the imaginary component ($X_c$) of the complex coupling impedance ($Z_c$) of the coil system occurs with the use of a mathematic model, which describes a coil system that is used for generating an alternating field, and which takes into account the influence of the surface on the coil impedance.

4. The method of claim 1, wherein different coils are used for generating the electromagnetic alternating field and as receiving coil.

5. The method of claim 1, wherein the measurements for determining the real component ($R_c$) and imaginary component ($X_c$) of the complex coupling impedance ($Z_c$) of the measuring coil are carried out in the following steps:

a) the real component $Re[Z_o]$ and imaginary component $Im[Z_o]$ of the complex impedance $Z_o$ of the measuring coil are measured without the influence of the surface, with $Z_o = Re[Z_o] + j*Im[Z_o]$;

b) the real component $Re[Z_m]$ and imaginary component $Im[Z_m]$ of the complex impedance $Z_m$ of the measuring coil are measured under the influence of the surface, with $Z_m = Re[Z_m] + j*Im[Z_m]$;

c) the real component $R_c$ and the imaginary component $X_c$ of the complex coupling impedance $Z_c = Re[Z_c] + j*Im[Z_c]$ are computed via the equations:

$R_c = Re[Z_c] = Re[Z_m] - Re[Z_o]$ $X_c = ImI[Z_c] = Im[Z_m] - Im[Z_o]$.

6. The method of claim 1, wherein the electric conductivity σ and the magnetic permeability μ of the material of the surface are considered in the determination of $R_c$ and $X_c$.

7. The method of claim 1, wherein the measurements are performed over a wide frequency range of between 10 kHz and 2 MHz.

8. The method of claim 2, wherein the coil system comprises a measuring coil and a reference coil, which is used to compensate the temperature and to determine $R_c$ and $X_c$.

9. The method of claim 8, wherein the quality $Q_m$ of the measuring coil and the quality $Q_R$ of the reference coil are the same at the maximum distance d between the sensor and the surface.

10. A device for determining the motion parameters of a conductive profiled surface, comprising
a sensor having a coil system comprising at least one coil for generating an electromagnetic alternating field, which is subjected, because of the feedback resulting from position changes between the surface and the sensor, to a variation, which can be determined by means of the coil system,
and wherein the coupling impedance $Z_c$ of the coil system is measurable, with an arrangement of measuring means being provided to determine the real component $R_c$ and the imaginary component $X_c$ of the complex coupling impedance $Z_c$ of the coil system, and to compute the distance d and the relative speed or rotational speed between the surface and the sensor based on the aforesaid measurements, and
wherein the coil system comprises a measuring coil which comprises a flat support, and winding components which are oriented in an x-direction which are located on the surface of the support that faces the surface, and winding components extending in a y-direction which are arranged on the surface of the support that faces away from the surface.

11. The device of claim 10, wherein the coil system of the sensor comprises at least two coils.

12. The device of claim 10, wherein the coil system comprises a measuring coil for generating an alternating field, which can be described by a mathematical model, and wherein the measuring coil is constituted such that the mathematic model can be used in the computation of the coil parameters.

13. The device of claim 12, wherein the measuring coil has only one layer of windings.

14. The device of claim 10, wherein different coils are used for generating the electromagnetic alternating field and as a receiving or measuring coil.

15. The device of claim 10, wherein the coil system comprises a measuring coil and wherein the magnetic field of the measuring coil monotonically increases in the direction of movement independently of the distance as far as the center of the measuring coil and thereafter monotonically decreases again.

16. The device of claim 10, wherein the profiled surface comprises alternating teeth and slots, and wherein the dimension of the support in the direction of movement corresponds approximately to one tooth-slot pitch of the profiled surface.

17. The device of claim 10 wherein the support is made of a ferromagnetic, electrically poorly conducting material.

18. The device of claim 10, wherein the support and the surface are made of the same ferromagnetic material.

19. The device of claim 10, wherein each of the winding components extending in the y-direction comprises a plurality of wires which are twisted together.

20. The device of claim 19, wherein the measuring coil is made with the use of planar technology.

21. The device of claim 10, wherein the magnetic field of the winding components extending in the y-direction are compensated by an opposing field.

22. The device of claim 10, wherein the coil system includes a reference coil, whose parameters are largely independent of the influence of the surface.

23. The device of claim 22, wherein the reference coil is made as an annular coil.

24. The device of claim 22, wherein the coil system comprises a measuring coil for generating the electromagnetic field and said reference coil, and wherein the quality of the reference coil corresponds to the quality of the measuring coil at a maximal distance between the sensor and the profiled surface.

25. A method for determining motion parameters of a conductive profiled surface relative to a sensor, with the sensor having a coil system comprising at least one coil, and comprising the steps of generating an electromagnetic alternating field from the coil system of the sensor, subjecting the field by reason of the feedback resulting from position changes between the surface and the sensor to a variation which can be sensed by the coil system, and deriving the position changes from the complex coupling impedance $Z_c$ of the coil system, and including determining the real component $R_c$ and the imaginary component $X_c$ of the complex coupling impedance $Z_c$ of the coil system, and computing a distance d between the sensor and the surface based on the determined values of the real component and the imaginary component and using an algorithm, communicating the computed distance d to a user, and wherein the measurements for determining the real component ($R_c$) and imaginary component ($X_c$) of the complex coupling impedance ($Z_c$) of the measuring coil are carried out in the following steps:

a) the real component $Re[Z_o]$ and imaginary component $Im[Z_o]$ of the complex impedance $Z_o$ of the measuring coil are measured without the influence of the surface, with $Z_o = Re[Z_o] + j*Im[Z_o]$;

b) the real component $Re[Z_m]$ and imaginary component $Im[Z_m]$ of the complex impedance $Z_m$ of the measuring coil are measured under the influence of the surface, with $Z_m = Re[Z_m] + j*Im[Z_m]$;

c) the real component $R_c$ and the imaginary component $X_c$ of the complex coupling impedance $Z_c = Re[Z_c] + j*Im[Z_c]$ are computed via the equations:

$R_c = Re[Z_c] = Re[Z_m] - Re[Z_o]$ $X_c = Im[Z_c] = Im[Z_m] - Im[Z_o]$.

26. A method for determining motion parameters of a conductive profiled surface relative to a sensor, with the sensor having a coil system comprising at least one coil, and comprising the steps of generating an electromagnetic alternating field from the coil system of the sensor, subjecting the field by reason of the feedback resulting from position changes between the surface and the sensor to a variation which can be sensed by the coil system, and deriving the position changes from the complex coupling impedance $Z_c$ of the coil system, and including determining the real component $R_c$ and the imaginary component $X_c$ of the complex coupling impedance $Z_c$ of the coil system, and computing a distance d between the sensor and the surface based on the determined values of the real component and the imaginary component and using an algorithm, communicating the computed distance d to a user, wherein the coil system of the sensor comprises at least two coils, with one of the coils being used to compensate for drifts or other influences, wherein the coil system comprises a measuring coil and a reference coil, which is used to compensate the temperature and to determine $R_c$ and $X_c$, and wherein the quality $Q_m$ of the measuring coil and the quality $Q_R$ of the reference coil are the same at the maximum distance d between the sensor and the surface.

27. A device for determining the motion parameters of a conductive profiled surface, comprising a sensor having a coil system comprising at least one coil for generating an electromagnetic alternating field, which is subjected, because of the feedback resulting from position changes between the surface and the sensor, to a variation, which can be determined by means of the coil system, and wherein the coupling impedance $Z_c$ of the coil system is measurable, with an arrangement of measuring means being provided to determine the real component $R_c$ and the imaginary component $X_c$ of the complex coupling impedance $Z_c$ of the coil system, and to compute the distance d and the relative speed or rotational speed between the surface and the sensor based on the aforesaid measurements, and wherein the coil system comprises a measuring coil and wherein the magnetic field of the measuring coil monotonically increases in the direction of movement independently of the distance as far as the center of the measuring coil and thereafter monotonically decreases again.

28. A device for determining the motion parameters of a conductive profiled surface, comprising a sensor having a coil system comprising at least one coil for generating an electromagnetic alternating field, which is subjected, because of the feedback resulting from position changes between the surface and the sensor, to a variation, which can be determined by means of the coil system, and wherein the coupling impedance $Z_c$ of the coil system is measurable, with an arrangement of measuring means being provided to determine the real component $R_c$ and the imaginary component $X_c$ of the complex coupling impedance $Z_c$ of the coil system, and to compute the distance d and the relative speed or rotational speed between the surface and the sensor based on the aforesaid measurements, wherein the coil system includes a reference coil, whose parameters are largely independent of the influence of the surface, and wherein the coil system comprises a measuring coil for generating the electromagnetic field and said reference coil, and wherein the quality of the reference coil corresponds to the quality of the measuring coil at a maximal distance between the sensor and the profiled surface.

* * * * *